United States Patent
Shea et al.

[11] Patent Number: 5,865,999
[45] Date of Patent: *Feb. 2, 1999

[54] NOZZLELESS UNDERDRAIN FOR GRANULAR FILTRATION SYSTEM

[75] Inventors: Edward M. Shea; J. Holland Scott, both of Salt Lake City; Kathleen R. Gammell, Midvale, all of Utah

[73] Assignee: Baker Hughes Incorporated, Houston, Tex.

[*] Notice: The term of this patent shall not extend beyond the expiration date of Pat. No. 5,332,497.

[21] Appl. No.: 251,734

[22] Filed: May 31, 1994

Related U.S. Application Data

[63] Continuation-in-part of Ser. No. 782,136, Oct. 25, 1991, Pat. No. 5,332,497.

[51] Int. Cl.$^6$ .................................................. B01D 24/38
[52] U.S. Cl. .......................... 210/289; 210/291; 210/541
[58] Field of Search .................................. 210/232, 274, 210/275, 279, 289, 291, 293, 541, 542

[56] References Cited

U.S. PATENT DOCUMENTS

| | | | |
|---|---|---|---|
| 1,069,737 | 8/1913 | Stevenson . | |
| 1,773,417 | 8/1930 | Whitacre . | |
| 1,871,122 | 8/1932 | Kretzschmar . | |
| 2,710,692 | 6/1955 | Kegel et al. | 210/130 |
| 2,767,852 | 10/1956 | Ellila | 210/171 |
| 3,110,667 | 11/1963 | Stuppy | 210/275 |
| 3,613,888 | 10/1971 | Harris | 210/274 |
| 3,831,761 | 8/1974 | Chantereau | 210/274 |
| 3,956,134 | 5/1976 | Sturgill | 210/275 |
| 4,064,050 | 12/1977 | Heaney et al. | 210/293 |
| 4,065,391 | 12/1977 | Farabaugh | 210/274 |
| 4,118,322 | 10/1978 | San Roman | 210/136 |
| 4,133,766 | 1/1979 | Adie | 210/293 |
| 4,196,079 | 4/1980 | Ward | 210/274 |
| 4,214,992 | 7/1980 | Sasano et al. | 210/274 |
| 4,331,542 | 5/1982 | Emrie | 210/794 |
| 4,536,287 | 8/1985 | Himsley et al. | 210/293 |
| 4,619,765 | 10/1986 | Roberts | 210/289 |
| 5,019,259 | 5/1991 | Hambley | 210/274 |
| 5,068,034 | 11/1991 | Walter | 210/232 |
| 5,087,361 | 2/1992 | Gaudin et al. | 210/293 |
| 5,087,362 | 2/1992 | Brown | 210/293 |
| 5,108,627 | 4/1992 | Berkebile et al. | 210/274 |
| 5,118,419 | 6/1992 | Evans et al. | 210/291 |
| 5,156,738 | 10/1992 | Maxson | 210/274 |
| 5,269,920 | 12/1993 | Brown et al. | 210/274 |
| 5,296,138 | 3/1994 | Walter | 210/274 |
| 5,332,497 | 7/1994 | Shea et al. | 210/274 |

FOREIGN PATENT DOCUMENTS

| | | |
|---|---|---|
| 669712 | 1/1939 | Germany . |
| 1153346 | 8/1963 | Germany . |
| 298867 | 12/1954 | Switzerland . |
| 123152 | 2/1919 | United Kingdom . |
| 2002251 | 8/1978 | United Kingdom . |

*Primary Examiner*—Ivars Cintins
*Attorney, Agent, or Firm*—Trask, Britt & Rossa

[57] ABSTRACT

A self-supporting modular underdrain member for use in a liquid filtration system comprises a main body or housing including a pair of longitudinally extending inclined walls which may have a pair of generally triangular transverse walls connecting the inclined walls to one another, the inclined walls each being provided with a pair of longitudinally extending recesses and a plurality of orifices communicating with each of the recesses. A pair of flanges are connected to the inclined walls for attaching the underdrain body to a floor surface so that the inclined walls, any transverse walls and the floor surface define a cross-sectionally triangular underdrain chamber. Two pairs of elongate cover plates are attached to the inclined walls over the recesses to form in each of the inclined walls a pair of longitudinally extending plenums for the equalization of backwash air and water flow, each of the cover plates being provided with a plurality of spaced slots.

29 Claims, 7 Drawing Sheets

NOZZLELESS UNDERDRAIN FOR GRANULAR FILTRATION SYSTEM

This application is a continuation-in-part of application Ser. No. 07/782,136, filed Oct. 25, 1991, now U.S. Pat. No. 5,332,497.

FIELD OF THE INVENTION

This invention relates to an underdrain member for use in a granular filtration system. More particularly, this invention relates to such an underdrain member which is modular and which can be used in the granular media filtration of potable water, process water, or waste water.

BACKGROUND OF THE INVENTION

Gravity filtration systems generally comprise a filter bed of one or more granular filter media. A liquid is filtered by flowing downwardly through the filter media and through openings in a filtration tank or underdrain disposed below the filter media. The gravity filtration system is cleaned by backwashing air and/or water from the filtration tank or underdrain in a direction opposite to the flow of liquid during the filtration process. It is extremely important for the backwash to have an even distribution. A nonuniform backwash flow can fail to clean parts of the filter media and can disrupt the filter bed, which reduces the life of the filtration system.

The only low-cost underdrain currently on the market requires extensive grout work during installation and is therefore fairly difficult to install. There is a need for an underdrain which is inexpensive, easy to install and easily adaptable to different applications.

OBJECTS OF THE INVENTION

An object of the present invention is to provide an underdrain member which provides for an even backwash distribution of water, air, or air and water together in a granular filtration system.

Another object of the present invention is to provide an underdrain member which is easily adapted to filter bays of different sizes.

A further object of the present invention is to provide an underdrain member which is easily attached to a floor surface.

Yet another object of the present invention is to provide an underdrain member which produces an even backwash flow distribution even if the underlying floor surface is not perfectly level.

Another, more particular, object of the present invention is to provide such an underdrain member which distributes both air and water simultaneously during a backwash operation.

A further particular object of the present invention is to provide such an underdrain member wherein distribution of air for backwash is completely independent of the distribution of water for backwash.

An additional object of the present invention is to provide an underdrain member which is inexpensive and has reduced installation costs.

SUMMARY OF THE INVENTION

A self-supporting, preferably modular, underdrain member for use in a liquid filtration system comprises, in accordance with the present invention, a main body or housing including a plurality of walls which at least partially defines an underdrain chamber, i.e., a chamber which serves to guide an effluent to an outlet during a filtering operation and a backwash fluid from a fluid source during a filter cleaning operation. The backwash fluid may be a liquid such as water, a gas such as air, or both a liquid and a gas. The underdrain housing is provided with attachment elements for attaching the housing to a floor surface. At least one of the walls of the underdrain housing is provided with a recess, while a cover plate is attached to the one wall over the recess to form a plenum at that wall. The wall with the recess is formed with a plurality of first orifices to establish communication between the underdrain chamber and the plenum, the cover plate being provided with a plurality of second orifices to establish communication between the plenum and a filter-medium-containing space overlying the underdrain member in the liquid filtration system. Both the first and second orifices may vary in size and spacing to optimize backwash water distribution.

The main body preferably has an open side juxtaposable to the floor surface so as to define the underdrain chamber therewith.

The plenum in an underdrain member in accordance with the present invention defines a secondary air or water distribution channel. Particularly in the case where the channel is used in the distribution of air during a backwash operation, the orifices may be provided in different sizes and with different spacings to optimize the equalization of air pressure in the plenum and thereby equalize the backwash flow from the plenum through the second orifices.

Pursuant to a particular feature of the present invention, the second orifices take the form of slots. Preferably, the cover plate is an elongate member and the slots each extend transversely with respect to the cover plate. Also, the slots may vary in size and may be sized small enough to prevent the passage of fine filter media grains such as sand through the cover plate. In this case, gravel may be eliminated from the filtration system. Pursuant to another feature of the present invention, the slots may be tapered.

In accordance with a specific embodiment of the present invention, the housing includes two inclined walls, each of the inclined walls being provided with a plurality of substantially parallel elongate recesses and a like plurality of elongate cover plates, each attached to the respective inclined wall over a respective one of the recesses to thereby form a plurality of elongate plenums at each of the inclined walls. One plenum in each wall is above the other plenum in that wall and serves as an air distribution channel. The lower plenum serves as a water distribution channel. Each of the inclined walls is formed with a plurality of first orifices to establish communication between the underdrain chamber and the plenums in the respective wall. Each of the cover plates is provided with a plurality of second orifices to establish communication between the respective plenum and a filter-medium-containing space of the liquid filtration system. As discussed hereinabove, the second orifices preferably take the form of slots. In addition, the orifices between the underdrain chamber and the upper plenums are relatively small, while the orifices between the underdrain chamber and the lower plenums are relatively large.

Pursuant to another feature of the present invention, the attachment elements include a first flange and a second flange, the first flange defining a recess for matingly receiving the second flange of another underdrain in the filtration system.

In accordance with another conceptualization of the present invention, a self-supporting underdrain in a liquid filtration system comprises a primary body or housing including a plurality of walls which at least partially defines a primary underdrain chamber for guiding an effluent to an outlet during a filtering operation and a backwash liquid and/or gas from a backwash source or sources during a cleaning operation. Attachment elements are provided for attaching the primary body to a floor surface. A secondary body is connected to the primary body of the underdrain for defining a secondary chamber communicating via a plurality of orifices with the primary chamber, the orifices being disposed in a first wall of the primary body and the secondary body. The secondary body is provided with a plurality of spaced slots in a second wall different from and spaced from the first wall to enable backwash fluid entering the secondary chamber from the primary chamber to exit the secondary chamber to a filter-medium-containing space overlying the underdrain member in the liquid filtration system.

As discussed hereinabove, the first wall is provided with a recess, while the secondary body and the second wall comprise an elongate plate provided with the spaced slots. The elongate plate is attached to the first wall to cover the recess and thereby form the secondary chamber. As further discussed above, the slots may be small enough to prevent the passage of filter media grains through the cover plate.

In accordance with yet another conceptualization of the present invention, a self-supporting underdrain member for use in a liquid filtration system comprises a main body or housing having a plurality of walls which at least partially define a primary underdrain chamber for guiding an effluent to an outlet during a filtering operation and a backwash liquid and/or gas from a backwash source or sources during a cleaning operation, attachment elements being provided for attaching the main body to the floor surface. A closure is connected to the main body for defining along at least one of the walls a secondary chamber or plenum having a second volume substantially smaller than the first volume. The wall bearing the closure is provided with a plurality of first orifices to enable communication between the primary chamber and the secondary chamber, the closure being provided with a plurality of second orifices to enable communication between the secondary chamber and a filter-media-containing space overlying the underdrain member in the liquid filtration system. The orifices preferably take the form of slots as described above.

The secondary chamber or plenum generally has a volume less than one tenth the size of the primary chamber. The secondary chamber may even be less than one percent the size of the primary chamber. It is to be noted, however, that the pressure equalization function of the secondary chamber may be accomplished to some degree at even larger sizes of the secondary chamber, perhaps when that chamber is as large as a quarter of the size of the primary chamber.

An underdrain member in accordance with the present invention is designed to be a fully functional granular media filter underdrain capable of air scouring the media above it without the use of filter nozzles. Instead, traditional layers of gravel may be laid above the underdrain to keep the filter media out of the underdrain or, alternatively, a slot size may be used which will exclude the filter media from the underdrain.

An underdrain member in accordance with the present invention provides for an even backwash distribution in a granular filtration system. The underdrain member is easily adapted to filter bays of different sizes and is easily attached to a floor surface. The underdrain member produces an even backwash flow distribution even if the underlying floor surface is not perfectly level.

The underdrain member may be bolted directly to a reasonably level filter floor. A false floor or plenum is not required, only a gullet or piping to bring air and water into the underdrain chamber or filter bay.

The underdrain member is modular and can be easily mounted to a floor surface together with other similar modular underdrain members. The mating connector flanges facilitate the use of multiple underdrain members and thereby enable adaptation of the underdrain to filtration systems of different capacities.

The orifices and slots of the underdrain member may be provided, in accordance with the present invention, with different sizes and different spacings or densities to achieve optimal distribution of air and water for backwashing as well as control of the flow of filtered effluent. The slotted strips or cover plates of the underdrain member aid in both evenly distributing the backwash flows and excluding media or gravel.

An underdrain member in accordance with the present invention distributes both air and water simultaneously during a backwash operation and the distribution of air for backwash is completely independent of the distribution of water for backwash.

The underdrain member has the further advantages of being inexpensive and having reduced installation costs.

Another aspect of the invention is the design of the underdrain member so that the cover plates for the plenum may be quickly mechanically secured thereover.

A further aspect of the invention resides in the provision of end caps for the underdrain members for connection thereof end-to-end, and for sealing the free end of an underdrain member at the end of a row of such members.

Other and further alternative embodiments of the underdrain member according to the present invention are illustrated and described, including embodiments wherein a perforated horizontal baffle plate is used to divide the upper and lower portions of the underdrain member, permitting free communication of fluid therebetween but affording some suppression of flow surges and waves within the underdrains during backwash operations.

DETAILED DESCRIPTION

Figure 1:
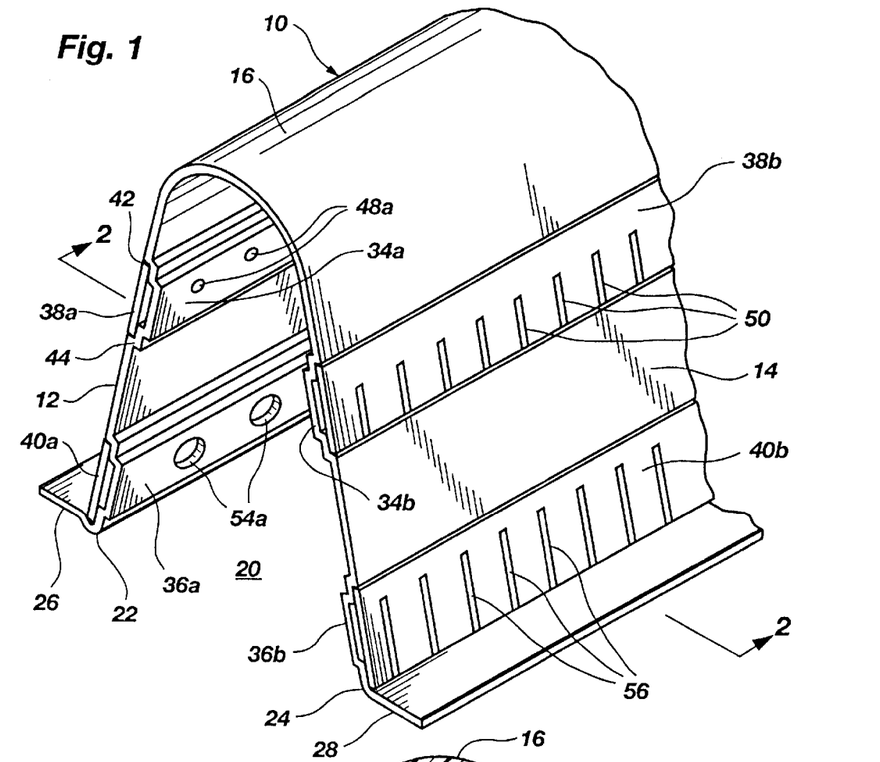
FIG. 1 is a partial isometric view of a modular underdrain member for use in a granular filtration system in accordance with the present invention, a transverse end wall being removed for illustration purposes.

As illustrated in the drawing, a modular nozzleless underdrain member comprises a main body or housing 10 which includes a pair of oppositely inclined, longitudinally extending side walls 12 and 14 connected to one another via a bight portion or upper wall 16 having a cross-section in the form of an inverted U. Housing or body 10 further includes a pair of generally triangular, transversely extending end walls 18 (only one end wall shown in the drawings). Each end wall 18 is connected or bonded to side walls 12 and 14 and bight portion 16.

Figure 2:
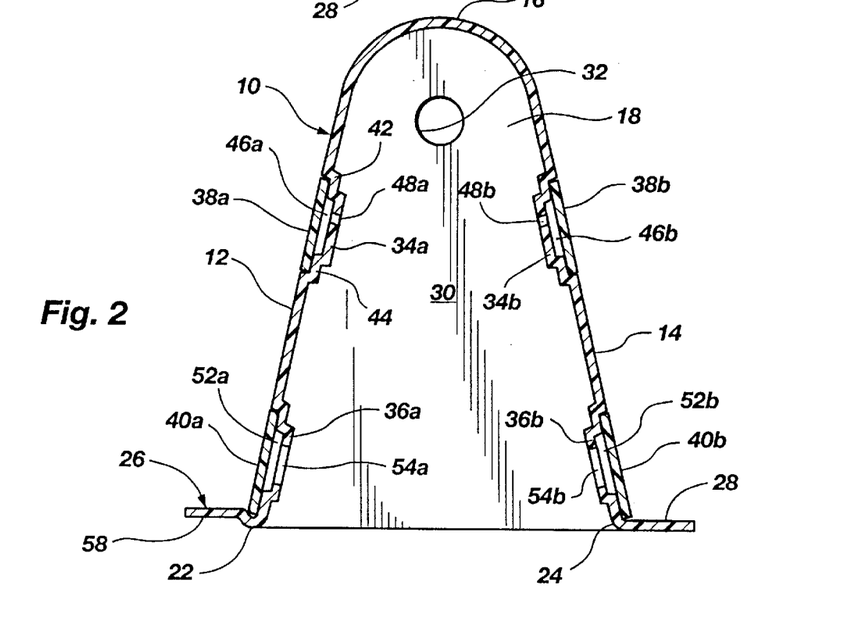
FIG. 2 is a transverse cross-sectional view taken in the direction of line 2—2 in FIG. 1, showing a slight modification of the design of FIG. 1.

Housing or body 10 has, on an underside, an opening 20 flanked by side walls 12 and 14. Side walls 12 and 14 are provided along their longitudinally extending lower edges 22 and 24 with respective outwardly extending horizontal flanges 26 and 28. Flanges 26 and 28 are each traversed by a respective plurality of spaced bolts (not shown) for attaching the modular underdrain to a floor surface to form a cross-sectionally triangular primary underdrain chamber 30. As in conventional underdrains, chamber 30 serves to guide an effluent to an outlet (not shown) during a filtering operation and a backwash liquid and/or gas from a backwash source or sources (not shown) during a cleaning operation. As shown in FIG. 2, an end wall 18 may be provided with an aperture 32 for coupling the underdrain member to a source of pressurized air or pressurized air may be introduced from below. Opening 20 may be used for coupling the underdrain member to a source of water.

Each side wall 12 and 14 is formed with a longitudinally extending upper recess wall 34a and 34b and a longitudinally extending lower recess wall 36a and 36b. The upper recess walls or regions 34a and 34b each receive a respective elongate cover plate 38a and 38b. Lower recess walls or regions 36a and 36b also receive respective cover plates 40a and 40b. Each recess wall 34a, 34b and 36a, 36b is provided with a pair of longitudinally extending shoulders 42 and 44 for seating the respective elongate recess cover plate 38a, 38b, 40a, or 40b.

Upper recess walls 34a and 34b and associated cover plates 38a and 38b define a pair of secondary chambers, plenums, or channels 46a and 46b for forming air blankets to equalize air pressure during a backwash operation. Plenums 46a and 46b are pressurized by air from primary underdrain chamber 30, chamber 30 communicating with plenums 46a and 46b via ports or orifices 48a and 48b spaced longitudinally along inclined side walls 12 and 14.

During a backwash operation, air flows from plenums 46a and 46b through respective pluralities of slots 50 formed in upper cover plates 38a and 38b. Slots 50 extend parallel to one another and transversely to the respective cover plate 38a and 38b. Slots 50 may be sufficiently narrow to prevent the passage of filter media particles through cover plates 38a and 38b. Preferably, the slots are slightly tapered.

Lower recess walls or regions 36a and 36b and associated cover plates 40a and 40b define two secondary chambers, plenums, or channels 52a and 52b for equalizing water flow during a backwash operation. Water flows into plenums 52a and 52b from primary underdrain chamber 30 via ports or orifices 54a and 54b spaced longitudinally along inclined side walls 12 and 14.

During a backwash operation, water flows from plenums 52a and 52b through respective pluralities of slots 56 formed in lower cover plates 40a and 40b. Slots 56 extend parallel to one another and transversely to the respective cover plate 40a and 40b. Slots 56 may be sufficiently narrow to prevent the passage of filter media particles through the lower cover plates. Preferably, the slots are slightly tapered.

Upper orifices 48a and 48b are smaller than lower orifices 54a and 54b and are positioned along an upper portion of upper recess walls 34a and 34b.

FIG. 2 deviates slightly from the illustration in FIG. 1 insofar as flange 26 is shown in FIG. 2 to have a staggered or offset portion 58 which defines, with a floor surface, a recess for matingly receiving the flange 28 of another modular underdrain in the filtration system.

The modular underdrain member described herein may be fabricated from any of a number of materials including, but not limited to, ABS plastic, PVC plastic, stainless steel, mild steel or aluminum.

Figure 3:
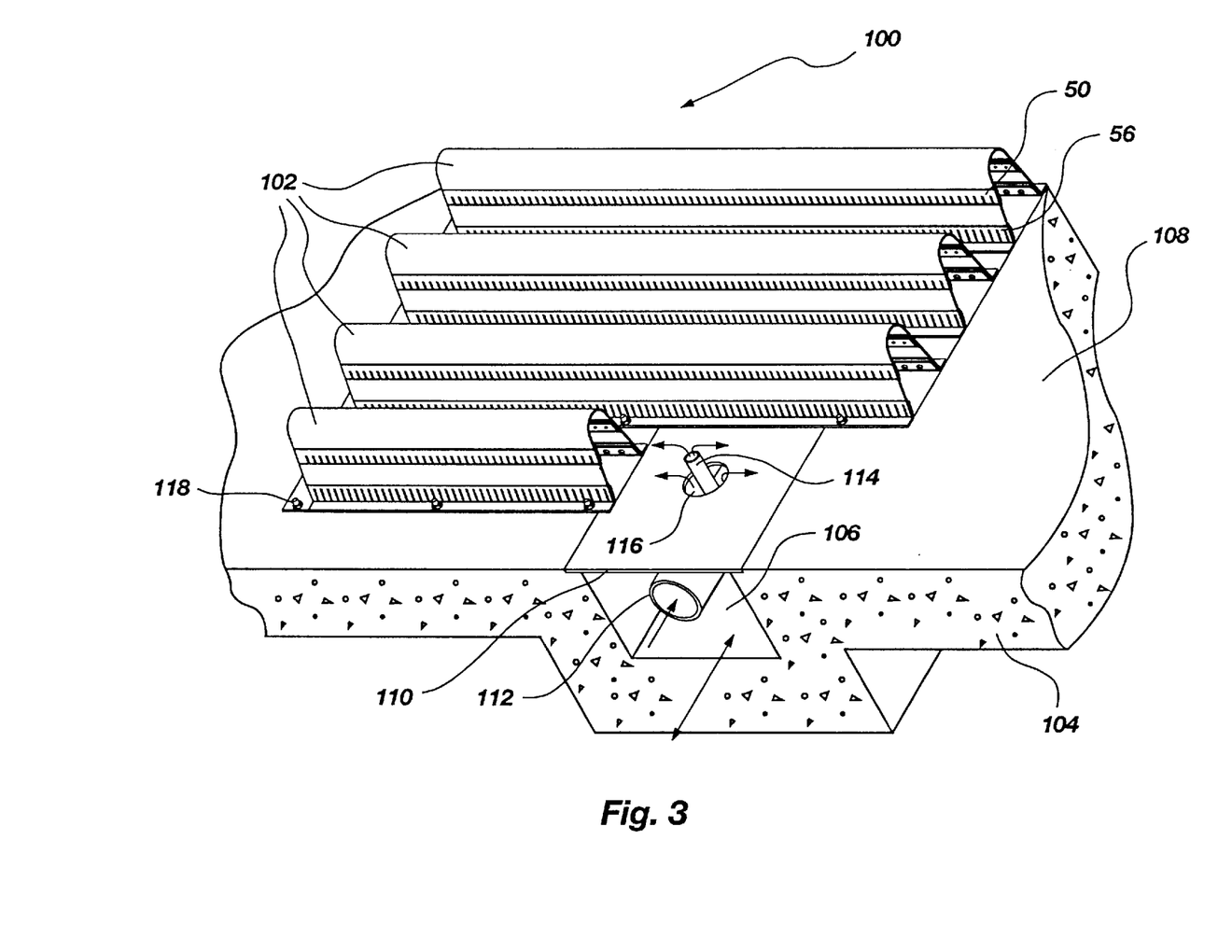
FIG. 3 is a perspective, partially cut away view of a granular filtration system in accordance with the present invention, employing modular underdrain members of the present invention.

FIG. 3 depicts an exemplary liquid filtration system 100 employing modular nozzleless underdrain members 102 according to any embodiment of the invention either heretofore or hereinafter described and illustrated. Liquid filtration system 100 includes a supporting floor 104, shown here by way of example as formed of concrete, floor 104 having a linear gullet or channel 106 therein, the top of which opens onto planar underdrain floor surface 108. The top of gullet 106 is covered with a plate of suitable material 110, such as metal, the upper surface of which is substantially flush with underdrain floor surface 108. An air header 112 is disposed in gullet 106, and a plurality of evenly-spaced vertical air feed pipes 114 extends upwardly through a like plurality of similarly-spaced apertures 116 in cover plate 110. Underdrain members 102 are disposed transversely to gullet 106 and are anchored to underdrain floor surface by suitable means such as anchor bolts 118. As will be readily appreciated from viewing foremost underdrain member 102, a portion of which has been cut away for clarity, an air feed pipe 114 extends upwardly into each underdrain member 102, and the aperture 116 through which each feed pipe 114 extends communicates with the interior of each underdrain member 102. If the underdrain member is of the embodiment depicted in FIGS. 1 and 2, wherein there is no floor in housing 10, aperture 116 communicates directly with the interior of the underdrain. If, however, the underdrain member is of the embodiment depicted in FIGS. 4 and 5, a suitable aperture is formed in the underdrain member floor and aligned with aperture 116. In normal filtering operations, the water to be filtered enters underdrain members through one or more layers of particulate such as sand or anthracite, in some cases supported by a gravel bed over the underdrain members, although this is not essential. The filtrate enters the interiors of underdrain members 102 through slots 50 and 56 on the exterior thereof and then passes into gullet 106 via apertures 116. During backwash operations, backwash water is pumped into gullet 106, up through apertures 116 into underdrain members 102, and enters the particulate filter bed from the underside through slots 50 and 56. If an air scour is used during the backwash, air is vented through air header 112 and feed pipes 114 into the upper portion of underdrain members 102, pressurized air blankets in the upper portion of the underdrain members maintaining a desired water level in the underdrain members so that the air exits the underdrain members 102 through the upper air scour slots 50 and the backwash water exits the underdrain members through the lower filtrate/backwash slots 56, as previously described.

Figure 4:
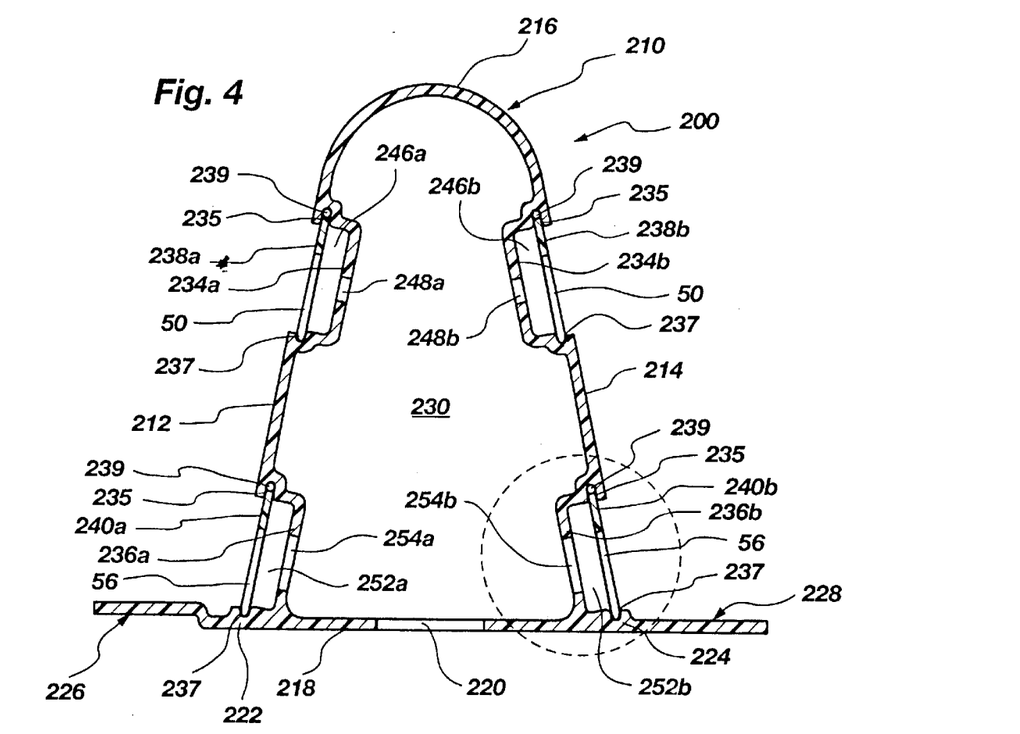
FIG. 4 is a transverse cross-sectional view of a preferred embodiment of the modular underdrain member of the present invention.
Figure 5:
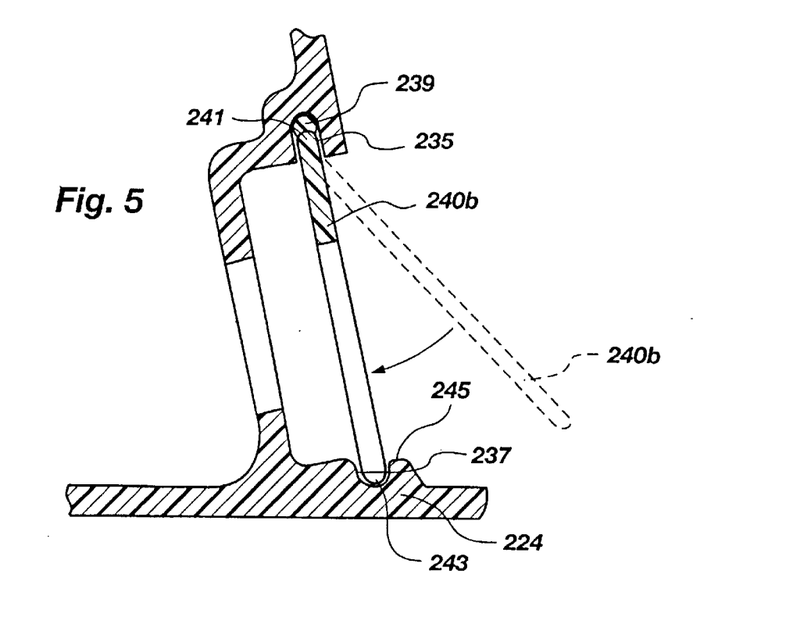
FIG. 5 is an enlarged cross-sectional view of the circled area of FIG. 4.

Referring now to FIGS. 4 and 5 of the drawings, a preferred embodiment 200 of the modular underdrain member 102 is depicted. Preferred embodiment 200 includes a main body or housing 210 which includes a pair of oppositely inclined, vertically and longitudinally extending side walls 212 and 214, which are joined at their upper extent by a bight portion or upper wall 216 of arcuate cross section. Housing 210 further includes a planar floor portion 218, in which an aperture 220 may be formed when the underdrain member is installed over a gullet. Sidewalls 212 and 214 are provided along their longitudinally extending lower edges 222 and 224 with outwardly extending horizontal flanges 226 and 228, respectively. Flanges 226 and 228 may be attached to an underdrain floor surface 108 with suitable fasteners, such as bolts, including explosively-driven, self-anchoring bolts such as are known in the art. As shown, flange 226 is elevated to accommodate thereunder a flange 228 of a laterally-adjacent underdrain member 200.

As with chamber 30 of the first embodiment of the invention, the interior of preferred embodiment 200 defines an underdrain chamber 230 of substantially triangular cross section. However, due to the integral floor portion 218 of embodiment 200, the chamber 230 is self-defined, unlike chamber 30, which relies upon a floor surface 108 to define its bottom. Thus, underdrain member 200 provides some accommodation for irregularities and non-planar portions in floor surface 108 without compromising the integrity of chamber 230. The only point at which a substantial seal with the underdrain floor surface 108 is especially desirable is at cover plate 110 and specifically wherein aperture 220 in floor portion 218 is aligned with aperture 116 in cover plate 110. As noted with respect to the first embodiment of the underdrain member, air may be introduced into the interior of underdrain 200 at its end as well as via a header and feedpipe arrangement of FIG. 3, or from the top, and backwash water may be similarly introduced at a number of points and from a variety of orientations.

The side walls 212 and 214 of underdrain 200 are formed, respectively, with longitudinally-extending upper recess walls 234a and 234b and longitudinally-extending lower recess walls 236a and 236b. The bottom edges of lower recess walls 236a and 236b are immediately adjacent floor portion 218. Each of the upper and lower recess walls is set inwardly from the planes of side walls 212 and 214, so as to define longitudinal channels opening into the side walls, and may be planar as shown or of other suitable configuration, such as arcuate or triangular. Adjacent the upper edge of each recess wall 234a, 234b, 236a and 236b is formed a longitudinally-extending seal and locking groove 235, while adjacent the lower edge of each recess wall 234a, 234b, 236a and 236b is formed a longitudinally-extending locking groove 237. As may more readily be appreciated by reference to FIG. 5, grooves 235 are preferably deeper than grooves 237, so that grooves 235 may receive a suitable resilient seal member 239 of rubber or other suitable elastomeric material.

Cover plates 238a, 238b, 240a and 240b are of similar longitudinal extent to sidewalls 212 and 214, and are of a width so as to permit the insertion of an upper edge 241 thereof into a seal and locking groove 235 having a seal member 239 disposed therein and the subsequent inward rotation of a lower edge 243 into alignment with the corresponding locking groove 237 as shown in FIG. 5, followed by release of the lower edge 243 into locking groove 237, where it is maintained by partially compressed seal member 239. If desired, the outer wall 245 of locking grooves 237 may be of reduced height, to facilitate alignment of lower edges 243 with locking grooves 237 and to reduce the necessary compression of seal members 239 when installing the cover plates. When installed, cover plates 238a, 238b, 240a and 240b are maintained in place solely by resilient seal members 239, seal members 239 also providing an air-tight seal at the top of chambers or plenums 246a, 246b, 252a and 252b. Thus, assembly of the underdrain embodiment of FIGS. 4 and 5 is greatly facilitated in comparison to that of the embodiment of FIGS. 1 and 2 in that no adhesive bonding or other securing means for installing the cover plates is required.

As with the first embodiment of the invention, apertures or orifices 248a, 248b, 254a and 254b extend through the recess walls to permit communication between chamber 230 and plenums 246a, 246b, 252a and 252b. Further, as with the first embodiment, mutually parallel, evenly spaced orifices or slots 50 and 56 oriented transversely to the cover plates are formed therein to permit communication between the plenums 246a, 246b, 252a and 252b and the exterior of underdrain member 200. As shown in FIG. 1, the slots (and particularly those of the upper cover plates) are preferably located below the upper edges of the cover plates, so as to provide an open-bottomed chamber for establishing an air blanket at the top of the upper chambers or plenums to equalize air pressure and air flow along the plenums and to compensate for imperfect leveling of the underdrain members on the underdrain floor surface 108. The vertical orientation of the slots is also beneficial for both air and water distribution during a backwash operation. Specifically, with respect to the upper plenums, the vertical slots provide for distribution of air via one air bubble per slot in a vertical direction. Further, the vertical slots have demonstrably prevented waves and uneven distribution of both air and water, both of which phenomena can be highly disruptive of the filter media over the underdrains. As an alternative to vertical slots, however, it is contemplated that short horizontal slots may be employed, as well as round apertures or apertures of triangular shape with apices oriented to the top. However, in all cases, the dimensions of the apertures between the interior and exterior of the underdrain must be designed to prevent particulate intrusion into the plenums and the central chamber 230 of the underdrain.

Air flow is controlled by suitable sizing and spacing of the orifices in the upper recess walls 234a and 234b and cover plates 238a and 238b, which is within the skill of one practicing the art. It is contemplated that a plurality of vertically-spaced orifices may be used in upper recess walls to sequentially vent air into the upper plenums and thereby more positively control the depth to which the air blanket in the top of the underdrain extends. Similarly, water flow is controlled by suitable sizing and spacing of the orifices in the lower recess walls 236a and 236b and cover plates 240a and 240b. Generally speaking, the orifices associated with the upper plenums will be smaller than those associated with lower plenums. As noted above, it is contemplated that the present invention may be employed without a gravel layer between the underdrain members and the filter media. It is further contemplated that the relative size of the plenums employed may be appreciably larger than shown, relative to the size of chamber 230, without diminishing the performance of the underdrain.

Figure 6A:
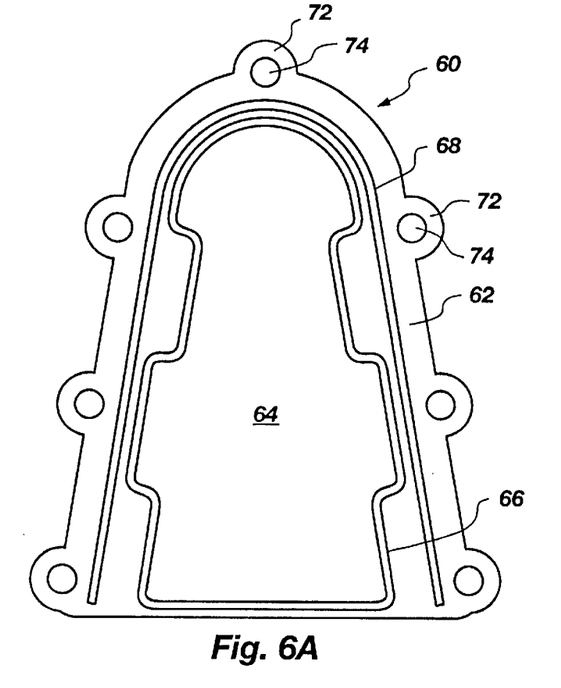
FIG. 6A is a front elevation of an end cap for joining modular ends of adjacent underdrain members according to the present invention.
Figure 6B:
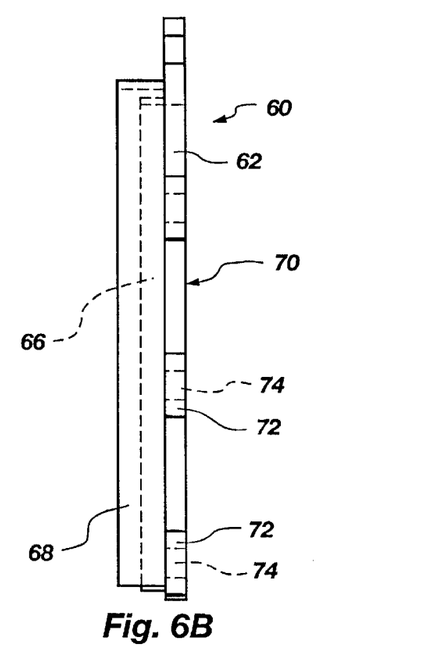
FIG. 6B is a side elevation of the end caps of FIG. 6A.

FIGS. 6A and 6B of the drawings depict a connection end cap 60 to be secured to an end of an underdrain member of the present invention to connect same end-to-end with another, like underdrain member for those applications wherein a filtration system is of greater length than a single underdrain member, which is most often the case. Connection end cap 60 is specifically configured for use with the underdrain member embodiment 200 illustrated and described in FIGS. 4 and 5, but it will be appreciated that it is equally adaptable to use with other embodiments when configured to match their cross-sections.

Connection end cap 60 includes an end wall 62 having an aperture 64 extending therethrough. Defining the perimeter of aperture 64 is a continuous first inner land 66 extending outwardly from the planar surface of one side of wall 62. First land 66 is shaped to accommodate and lie immediately inwardly of recess walls 234a, 234b, 236a and 236b and thus the plenums defined thereby when applied to the end of underdrain member 200. Likewise, first land 66 lies immediately inwardly of side walls 212 and 214, upper wall or bight portion 216, and floor 218 of underdrain member 200. Second, outer land 68 is spaced from first inner land 66, extends outwardly from the surface of wall 62, and is configured to lie adjacent and immediately outwardly of side walls 212 and 214 and upper wall or bight portion 216. Second outer land 68 preferably extends farther from wall 62 than first inner land 66, for a secure fit with underdrain member 200. Thus, when connector end cap 60 is applied to the end of an underdrain member 102 and specifically, as shown, to embodiment 200 thereof, lands 66 and 68 extend over the end of the underdrain, and it is desired that the configuration and relative mutual spacing of first and second lands 66 and 68 provide a snug, interference-type fit between end cap 60 and underdrain 200. The connection and seal between the end cap 60 and the underdrain 200 is then enhanced by application of a suitable adhesive, depending upon the material employed for the end cap 60 and the underdrain 200, which should preferably be the same.

The side of wall 62 opposite that on which lands 66 and 68 are disposed is flat, so as to provide an abutment and sealing surface or flange 70 for abutting a like flange of a second wall of another connector end cap 60 secured to the end of another underdrain member 200. The perimeter of wall 62 includes a plurality of protrusions or lugs 72 extending outwardly therefrom in the plane of the wall, lugs 72 having connector apertures 74 formed therethrough. When two connector end caps 60 are placed in abutment, lugs 72 and connector apertures 74 are aligned, and suitable connectors such as bolts with lock nuts are employed to secure the end caps 60, and thus their associated underdrain members 200, end-to-end. A preformed gasket may be disposed between flanges 70 to effect a seal, or a gasket or sealing compound, such as a Permatex® self-forming gasket, may be applied to one or both of flanges 70 immediately prior to their placement together.

Figure 7A:
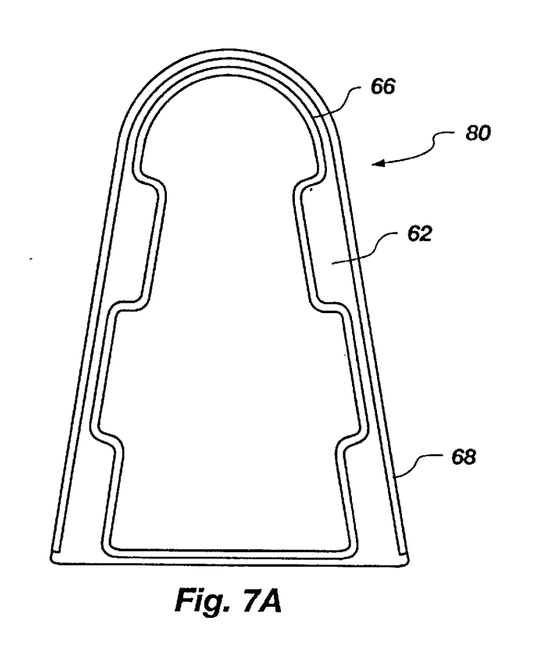
FIG. 7A is a front elevation of an end cap for closing an end of a modular underdrain member according to the present invention.
Figure 7B:
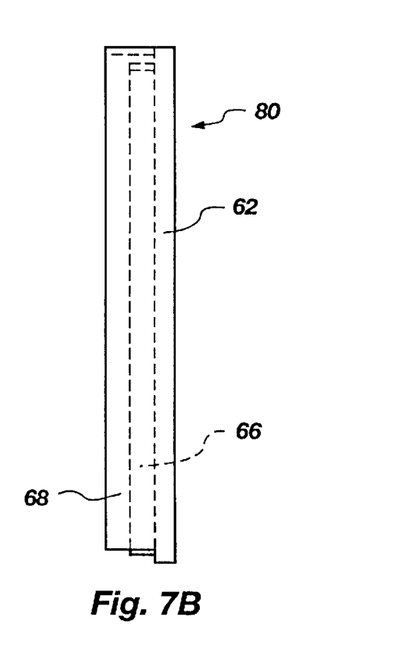
FIG. 7B is a side elevation of the end cap of FIG. 7A.

FIGS. 7A and 7B depict a terminal end cap 80 for use with the underdrain members according to the present invention and, as illustrated, is specifically configured for use with embodiment 200 as illustrated in FIGS. 4 and 5. Terminal end cap 80 is very similar to connector end cap 60, including a wall 62, which, however, in this instance is imperforate to seal the end of underdrain member 200 which lies at the outer extent of a row of such underdrain members in a filtration system. Terminal end cap 80 includes first inner and second outer lands 66 and 68 configured as previously described with respect to connector end cap 60, but is devoid of lugs 72 with their associated connector apertures 74, such being unnecessary. Of course, if desired, only a single end cap design 60 could be employed, with the inner portion of wall 62 remaining uncut and imperforate until such time as it is desired to form aperture 64. However, as it is contemplated that materials such as ABS or PVC plastics will be employed to form the end caps as well as the underdrains, a single mold with suitable inserts or blanks can be used to quickly and easily form both types of end caps during fabrication, thus saving the additional labor cost of subsequently cutting apertures 64 at the installation site.

It is also contemplated, although not preferred, that discontinuous lands or tabs may be employed to secure an end cap to an underdrain member, and/or that a groove to receive the end of the underdrain member may be formed in the end cap wall. A resilient seal, such as an elastomer, may be interposed between the end cap wall and the end of the underdrain.

Figure 8:
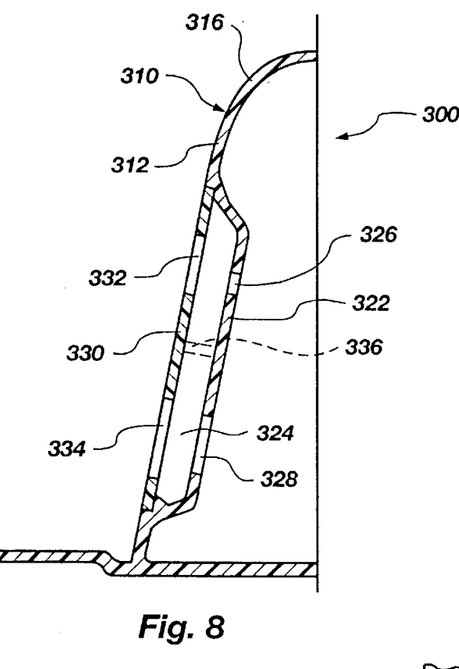
FIG. 8 is a transverse quarter-sectional view of a first alternative embodiment of the modular underdrain member according to the present invention.

FIG. 8 depicts an alternative embodiment 300 of the underdrain member of the present invention, wherein a main body 310 is formed with side walls 312 joined by upper wall 316. However, in lieu of separate upper and lower plenums as employed in the preceding embodiments, only a single recess wall 322 defining a single plenum 324 is located on each side of the underdrain member. A series of longitudinally-spaced upper orifices 326 is disposed above a series of longitudinally-spaced lower orifices 328 in recess wall 322. Upper apertures 326 are smaller than lower apertures 328. A cover plate 330 may be employed which has a set of upper slots 332 as well as a set of lower slots 334, or a single row of longer slots may be employed to feed both air (at their upper extent) and water (below the venting air). Further, if desired, a longitudinally-extending barrier element 336 formed or secured to either the recess wall 322 or the cover plate 330 may be employed to divide plenum 324 into upper and lower plenums to simulate the two-plenum design of the preceding embodiments, barrier element 336 also providing structural support for cover plate 330.

Figure 9:
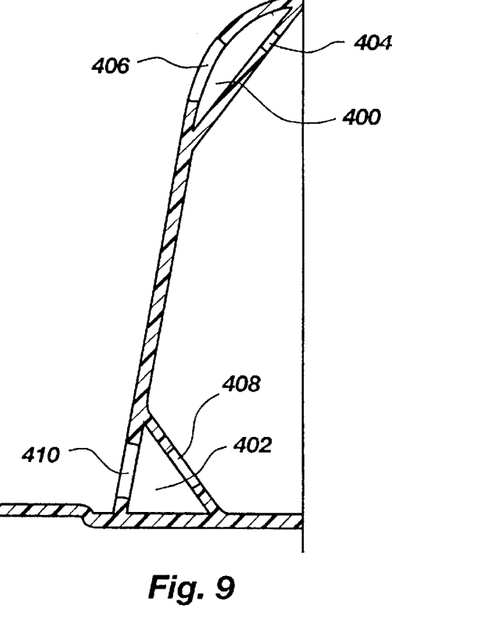
FIG. 9 is a transverse quarter-sectional view of a second alternative embodiment of the modular underdrain member according to the present invention.

As depicted in FIG. 9, the underdrain member of the present invention may be further modified via the use of differently-shaped plenums or chambers 400 and 402 and different orifice locations 404, 406, 408 and 410. The different plenum configurations may, as shown, provide additional structural support for the underdrains.

Figure 10:
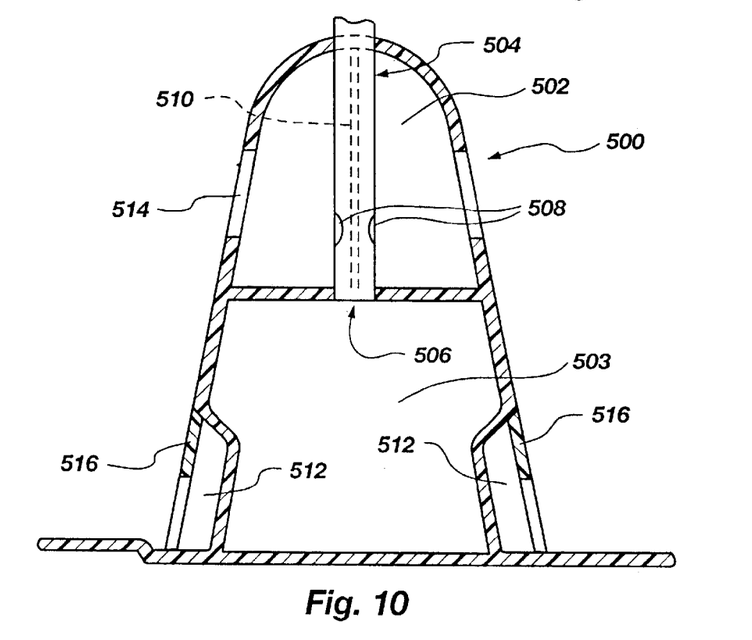
FIG. 10 is a transverse cross-sectional view of a third alternative embodiment of the modular underdrain member according to the present invention.

As depicted in FIG. 10, an alternative embodiment 500 of the underdrain of the invention may employ a single upper chamber or plenum 502 which is provided with air via a downwardly-extending feed pipe 504, the bottom 506 of feed pipe 504 being open to the lower portion 503 of the underdrain 500 so that the upper chamber 502 may communicate with the lower portion 503 during filtering operations via apertures 508 in the wall of feed pipe 504. As shown in broken lines, the upper chamber or plenum may be divided, if desired, into two upper plenums by use of a vertical wall 510. Two lower plenums 512 are employed in this embodiment. Slots 514 may be formed in the sidewalls of the underdrain member for communicating the upper plenum 502 with the underdrain exterior, while the lower plenums may employ slotted cover plates 516 secured to the underdrain as in the embodiments of FIGS. 1 and 2 or FIGS. 4 and 5.

Figure 11:
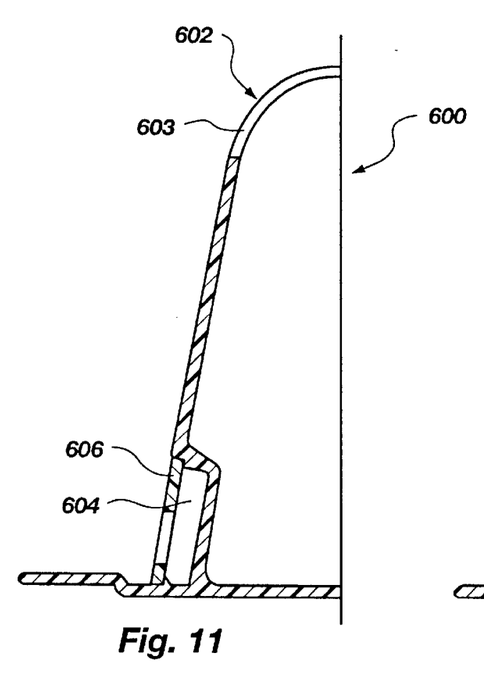
FIG. 11 is a transverse quarter-sectional view of a fourth alternative embodiment of the modular underdrain member according to the present invention.

FIG. 11 illustrates an embodiment 600 wherein the top or bight portion 602 of the underdrain is slotted at 603 for filtration and for air distribution during backwash operations, there being no upper plenum. Two lower plenums 604 are employed for filtration and water distribution during backwash. Lower plenums 604 may be covered with slotted cover plates 606 as previously described.

Figure 12:
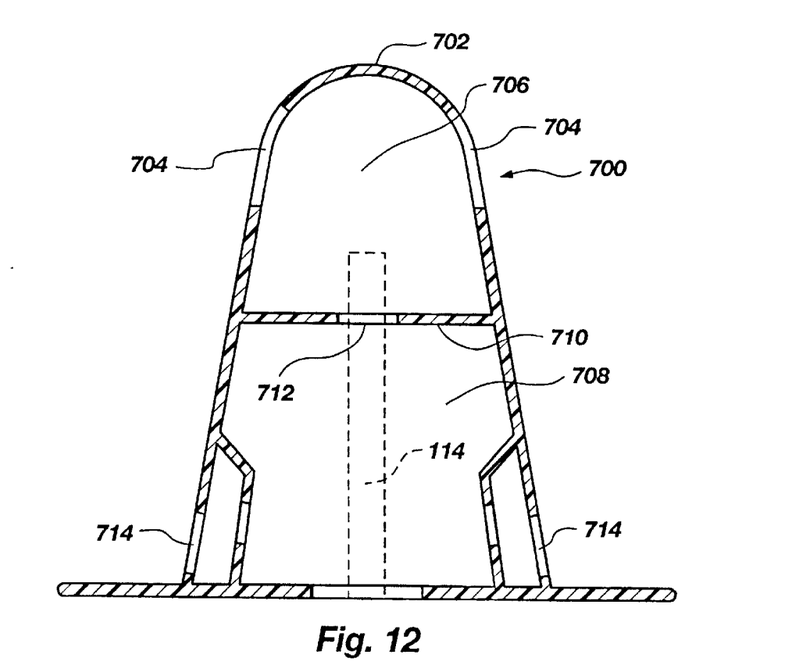
FIG. 12 is a transverse cross-sectional view of a fifth alternative embodiment of the modular underdrain member according to the present invention.

FIG. 12 illustrates yet another embodiment 700, wherein the top or bight portion 702 of the underdrain is slotted at 704, and an upper plenum 706 is divided from a lower plenum 708 via a horizontally-extending baffle wall 710 having a series of evenly-spaced perforations 712 formed therein for communication of the upper and lower plenums during both filtration and backwash operations. Thus, as with the other embodiments, the upper and lower plenums are not mutually isolated, and an air blanket originating in the upper plenum is employed to suppress the water level so as to cause same to flow solely through slots 714 in the sidewalls of the underdrain communicating the lower plenum 708 with the underdrain exterior.

Figure 13:
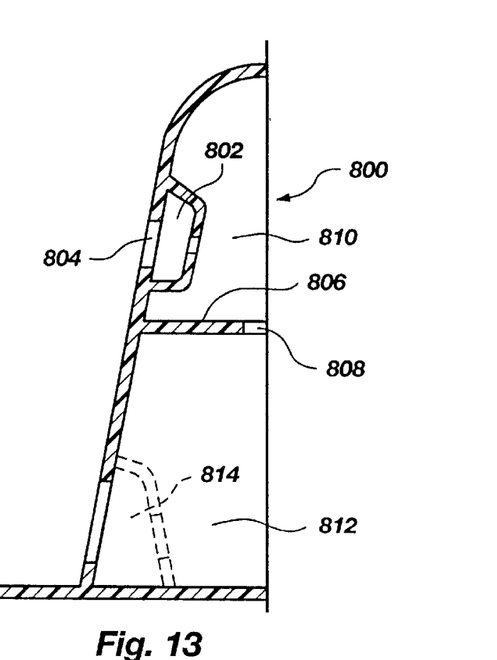
FIG. 13 is a transverse quarter-sectional view of a sixth alternative embodiment of the modular underdrain member according to the present invention.

Embodiment 800, depicted in FIG. 13, is a variation of the embodiment of FIG. 12, and employs upper plenums 802 communicating with the exterior of the underdrain via slots 804. Horizontal baffle wall 806 having a plurality of evenly spaced apertures 808 therein separates an upper chamber 810 communicating with upper plenums 802 from a lower chamber 812, which may communicate directly with the underdrain exterior or may, as shown in broken lines, employ discrete lower plenums 814 in the underdrain sidewalls to so communicate.

Figure 14:
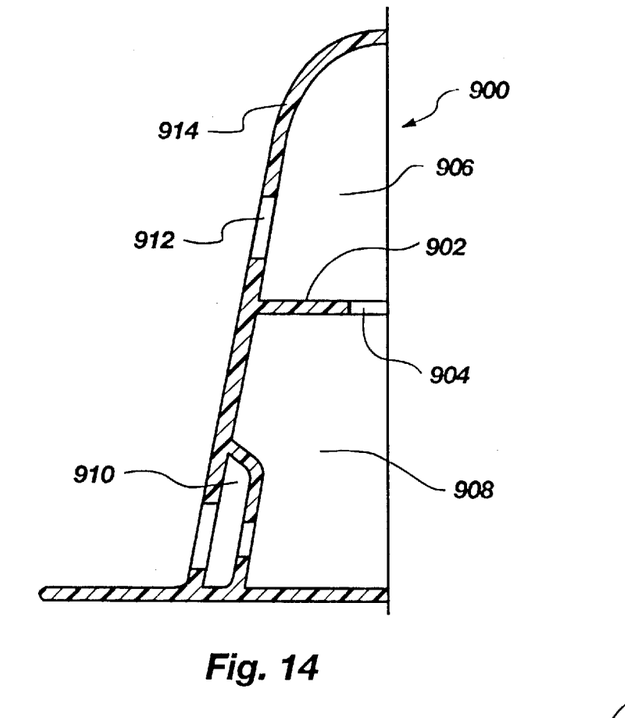
FIG. 14 is a transverse quarter-sectional view of a seventh alternative embodiment of the modular underdrain member according to the present invention.

FIG. 14 depicts another variation 900 of the embodiment of FIG. 12, wherein a horizontal baffle wall 902 having perforations 904 therethrough is employed to define an upper plenum 906 open to a lower chamber 908 which communicates with the underdrain exterior via longitudinally-extending lower plenums 910. Upper plenum 906 communicates with the exterior of underdrain member 900 via slots 912 in sidewalls 914.

Figure 15:
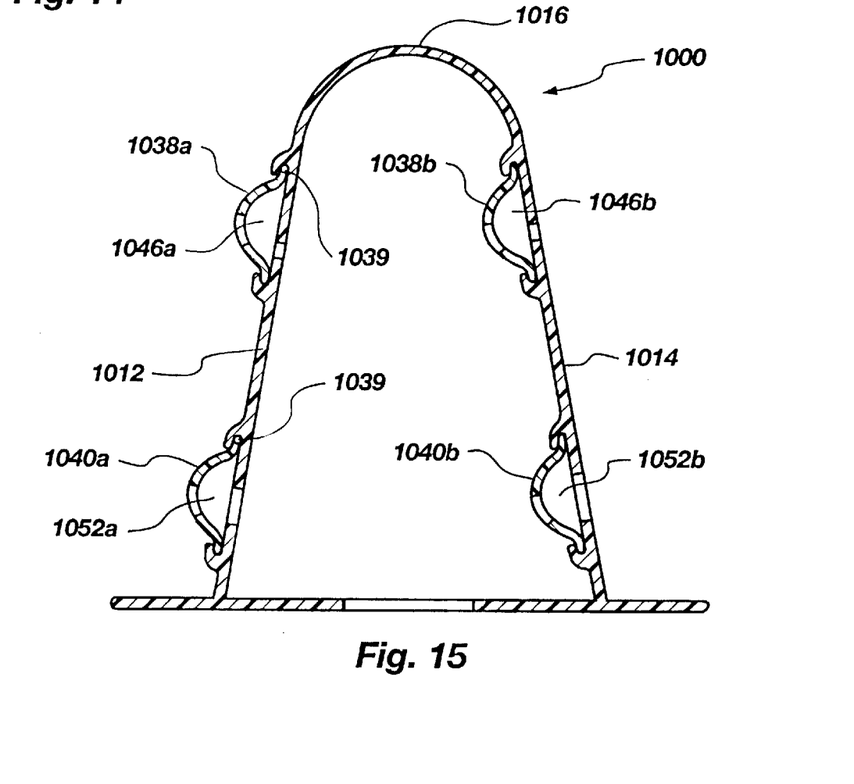
FIG. 15 is a transverse cross-sectional view of a seventh alternative embodiment of the modular underdrain member according to the present invention.

FIG. 15 depicts another embodiment 1000, having two substantially planar side walls 1012 and 1014 joined at their upper extent by a bight portion 1016. Plenums 1046a, 1046b, 1052a and 1052b are defined by non-planar cover plates 1038a, 1038b, 1040a and 1040b, respectively. As with the embodiment of FIGS. 4 and 5, the cover plates are secured within grooves associated with the side walls, but unlike that embodiment, the cover plates themselves provide a "recess wall" within (see left side or FIG. 15) or without (see right side of FIG. 15) a side wall. As shown at the left side of FIG. 15, seal means 1039 may be employed along the upper grooves, or an adhesive sealant may be employed in lieu thereof. While the cover plates illustrated are arcuate in transverse cross-section, it is contemplated that U-shaped or L-shaped cover plates might also be employed, or any other configuration suitable for defining a plenum. It is further contemplated that an underdrain member may be formed using both recess walls formed in side walls as well as non-planar cover plates, so that the plenum cavities are defined partially within recess walls and partially within cover plates.

Although the invention has been described in terms of particular embodiments and applications, one of ordinary skill in the art, in light of this teaching, can generate additional embodiments and modifications without departing from the spirit of or exceeding the scope of the claimed invention. For example, air or water distribution ports in the form of slots and flow equalization plenums in accordance with the present invention may be used in different underdrain configurations and still provide for an equalized backwash flow distribution. More specifically, slotted plates or small-volume equalization plenums may be used in horizontal walls of an underdrain rather than in inclined or vertical walls. Furthermore, upper orifices 48a and 48b, as well as lower orifices 54a and 54b, may have different sizes, inter-orifice spacings and different shapes, depending on the particular application. Discontinuous longitudinally-extending plenums may also be employed. It is to be noted, in addition, that some applications will not require both an air distribution plenum and a water distribution plenum as disclosed herein.

Accordingly, it is to be understood that the drawings and descriptions herein are proffered by way of example to facilitate comprehension of the invention and should not be construed to limit the scope thereof.

What is claimed is:

1. A self-supporting underdrain member for use in a liquid filtration system, comprising:

first and second longitudinally extending, laterally spaced side wall means joined by a longitudinally extending upper wall means to form an interior chamber thereunder;

at least one recess wall defining a longitudinally extending recess having an upper side and a lower side along at least one of said side wall means, said at least one recess wall having a plurality of longitudinally spaced orifices therethrough between an inside and outside of the recess defined thereby;

a first longitudinally extending groove associated with said side wall means adjacent one side of said recess;

a second longitudinally extending groove associated with said side wall means adjacent another side of said recess, facing said first groove and substantially parallel to said first groove; and a substantially longitudinally extending cover plate having longitudinally spaced orifices therethrough having first and second lateral edges associated with said at least one side wall means including said recess wall, said cover plate having a first lateral edge received in said first longitudinally extending groove and a second lateral edge received in said second laterally extending groove, said cover plate defining, with said recess, a plenum on said at least one side wall means.

2. The underdrain member of claim 1, further including a longitudinally extending, resilient seal element disposed in one of said first and second grooves, said resilient seal element being compressed between a bottom of a said groove in which it is disposed and an adjacent cover plate lateral edge received in that groove.

3. The underdrain member of claim 2, wherein said resilient seal element is disposed in an uppermost of said first and second grooves, and said recess orifices and said cover plate orifices are located below said resilient seal element.

4. The underdrain member of claim 1, wherein said recess faces an interior of said underdrain member.

5. The underdrain member of member 1, wherein said recess faces an exterior of said underdrain member.

6. The underdrain member of claim 1, wherein said at least one recess wall comprises a pair of mutually parallel recess walls located one above another along said at least one sidewall means.

7. The underdrain member of claim 1, further including a longitudinally extending planar floor portion joining said side wall means below said upper wall means and defining a bottom of said interior chamber.

8. An end cap for a self-supporting underdrain member including first and second longitudinally spaced side wall means joined by a longitudinally extending upper wall means to form an interior chamber thereunder, said side wall means and said upper wall means terminating at an end of said underdrain member on a plane transverse to said longitudinal extent thereof, said end cap comprising:

a wall having a planar surface on one side thereof;

a first inner land extending transversely to and outwardly from said planar surface of said wall;

a second land spaced from said first inner land extending transversely to and outwardly from said planar surface of said wall, said first and second lands defining a gap therebetween to receive at least portions of the side wall means and upper wall means therein when said end cap is disposed over an end of said underdrain member.

9. The end cap of claim 8, wherein at least one of said lands is substantially continuous.

10. The end cap of claim 8, wherein said wall includes an aperture therethrough at a location interior of said inner land, and a side of said wall opposite said planar surface comprises a flange.

11. The end cap of claim 10, wherein said wall includes means at a periphery thereof for securing said end cap to another substantially identical end cap with said flanges in abutting relationship.

12. The end cap of claim 11, wherein said securing means comprises a plurality of lugs disposed in spaced relationship about said wall periphery and in a plane thereof, and apertures extending through said lugs in transverse orientation to said wall, for receiving fastener means therethrough.

13. A self-supporting underdrain member for use in a liquid filtration system, comprising:

first and second longitudinally extending, laterally spaced side walls joined by a longitudinally extending upper wall to define an interior chamber; and a plenum extending longitudinally along at least one of said side walls, said first plenum having a first plurality of longitudinally-spaced orifices and a second plurality of longitudinally-spaced orifices therebelow extending through a vertically extending inner plenum wall and a first plurality of longitudinally spaced orifices and a second plurality of longitudinally-spaced orifices therebelow extending through a vertically extending outer plenum wall, said first pluralities of orifices being located below an upper extent of said plenum, providing an imperforate open bottom chamber in said plenum thereabove.

14. The underdrain member of claim 13, further including a longitudinally extending barrier element disposed between each of said inner and outer plenum walls, below said first pluralities of orifices and above said second pluralities of orifices.

15. The underdrain member of claim 13, wherein said at least one side wall including said first plenum includes a plurality of longitudinally spaced orifices thereabove.

16. The underdrain member of claim 13, wherein said at least one side wall including said first plenum includes a plurality of longitudinally spaced orifices therebelow.

17. A self-supporting underdrain member for use in a liquid filtration system, comprising:

first and second longitudinally extending, laterally spaced side walls joined by a longitudinally extending upper wall to define an interior chamber;

a first plenum extending longitudinally along at least one of said side walls, said first plenum having a first plurality of longitudinally-spaced orifices extending through a vertically extending inner plenum wall and a first plurality of longitudinally-spaced orifices extending through a vertically extending outer plenum wall, said first pluralities of orifices being located below an upper extent of said first plenum, providing an imperforate open bottom chamber in said first plenum thereabove; and a horizontal baffle having longitudinally-spaced apertures therethrough joining said side walls below said upper wall and defining upper and lower portions in said interior chamber.

18. The underdrain member of claim 17, wherein said first plenum is located below said baffle and said at least one side wall including said first plenum includes a plurality of longitudinally spaced orifices therethrough above said baffle.

19. The underdrain member of claim 18, further including a feedpipe extending downwardly through said upper wall into one of said baffle apertures.

20. The underdrain member of claim 19, wherein said feedpipe includes at least one aperture through a wall thereof and above said baffle.

21. The underdrain member of claim 17, wherein said first plenum is located above said baffle and said at least one side wall including said first plenum each further includes a plurality of longitudinally spaced orifices therethrough below said baffle.

22. The underdrain member of claim 17, wherein said first plenum is located below said baffle and said underdrain member further includes longitudinally spaced orifices through said upper wall.

23. The underdrain member of claim 17, further including a second plenum extending longitudinally along the same said at least one side wall as said first plenum, one of said plenums being located above said baffle, and the other of said plenums being located below said baffle.

24. The underdrain member of claim 17, further including a vertical baffle extending longitudinally along an interior of said underdrain member above said horizontal baffle, substantially dividing the interior of said underdrain above said baffle.

25. A self-supporting underdrain member for use in a liquid filtration system, comprising:

first and second longitudinally extending, laterally spaced side walls joined by a longitudinally extending upper wall to define an interior chamber; and a plenum extending longitudinally along at least one of said side walls, said plenum having a first plurality of longitudinally-spaced orifices extending through a vertically extending inner plenum wall and a first plurality of longitudinally-spaced orifices extending through a vertically extending outer plenum wall, said first pluralities of orifices being located below an upper extent of said plenum, providing an imperforate open bottom chamber in said plenum thereabove;

wherein said inner plenum wall includes at least a second plurality of longitudinally-spaced orifices below said first plurality of orifices extending therethrough.

26. A self-supporting underdrain member for use in a liquid filtration system, comprising:

first and second longitudinally extending, laterally spaced side walls joined by a longitudinally extending upper wall to define an interior chamber;

a horizontal baffle having a plurality of longitudinally spaced apertures therethrough joining said side walls below said upper wall and defining upper and lower portions in said interior chamber;

a first plurality of longitudinally spaced orifices through each of said walls above said baffle; and a second plurality of longitudinally spaced orifices through each of said side walls below said baffle.

27. A self-supporting underdrain member for use in a liquid filtration system, comprising:

first and second longitudinally extending, substantially planar side walls joined by a longitudinally extending upper wall to define an interior chamber;

a plurality of longitudinally-spaced orifices along at least one of said side walls and extending therethrough; and at least one longitudinally extending cover plate of non-planar cross-section secured over said plurality of orifices and defining a plenum between said at least one of said side walls and said cover plate, said cover plate having a plurality of longitudinally-spaced orifices therethrough, said cover plate having lateral edges secured in grooves in said at least one side wall.

28. The underdrain member of claim 27, wherein said cover plate is secured to the interior of said at least one side wall.

29. The underdrain of claim 27, wherein said cover plate is secured to the exterior of said at least one side wall.

* * * * *